United States Patent
Lavigne et al.

(10) Patent No.: US 11,804,011 B2
(45) Date of Patent: Oct. 31, 2023

(54) METHOD AND APPARATUS FOR INTERACTIVE VOLUMETRIC VISUALIZATION

(71) Applicant: LlamaZOO Interactive Inc., Victoria (CA)

(72) Inventors: Charles Lavigne, Victoria (CA); Li Jl, Victoria (CA)

(73) Assignee: LlamaZOO Interactive Inc., Victoria (CA)

(*) Notice: Subject to any disclaimer, the term of this patent is extended or adjusted under 35 U.S.C. 154(b) by 35 days.

(21) Appl. No.: 17/447,804

(22) Filed: Sep. 15, 2021

(65) Prior Publication Data
US 2023/0082349 A1  Mar. 16, 2023

(51) Int. Cl.
| G06T 19/00 | (2011.01) |
| G06T 17/20 | (2006.01) |
| G06T 15/08 | (2011.01) |
| G06T 1/20 | (2006.01) |
| G06T 15/00 | (2011.01) |
| G06T 15/20 | (2011.01) |
| G06T 15/50 | (2011.01) |

(52) U.S. Cl.
CPC .............. *G06T 19/00* (2013.01); *G06T 1/20* (2013.01); *G06T 15/005* (2013.01); *G06T 15/08* (2013.01); *G06T 15/20* (2013.01); *G06T 15/503* (2013.01); *G06T 17/20* (2013.01); *G06T 2200/24* (2013.01)

(58) Field of Classification Search
CPC .......... G06T 19/00; G06T 1/20; G06T 15/005; G06T 15/08; G06T 15/20; G06T 15/503; G06T 17/20; G06T 2200/24
See application file for complete search history.

(56) References Cited

U.S. PATENT DOCUMENTS

| 2007/0206008 A1* | 9/2007 | Kaufman et al. ...... G06T 15/06 345/427 |
| 2011/0069069 A1* | 3/2011 | Engel .................... G06T 15/08 345/426 |

(Continued)

OTHER PUBLICATIONS

Chang, E., Kim, H. T., and Yoo, B. "Virtual reality sickness: A review of causes and measurements." International Journal of Human-Computer Interaction, 2020, 36(17):1658-1682.

(Continued)

*Primary Examiner* — Sing-Wai Wu
*Assistant Examiner* — Khoa Vu
(74) *Attorney, Agent, or Firm* — DENTONS CANADA LLP

(57) ABSTRACT

Disclosed is a method and apparatus for enabling interactive visualization of three-dimensional volumetric models. The method involves maintaining three-dimensional volumetric models represented by explicit surfaces. In accordance with an embodiment of the disclosure, the method also involves, for a current point of view, generating and displaying images of the volumetric models in a manner that clarifies internal structures by accounting for light attenuation inside the volumetric models as a function of spatial positions of the explicit surfaces. The method also involves, upon receiving user input that adjusts a display variable, repeating the generating and the displaying of the images in accordance with the display variable that has been adjusted, thereby enabling interactive visualization of the volumetric models while simultaneously clarifying the internal structures by accounting for the light attenuation inside the volumetric models.

20 Claims, 8 Drawing Sheets

(56) References Cited

U.S. PATENT DOCUMENTS

| | | | | |
|---|---|---|---|---|
| 2014/0232719 | A1* | 8/2014 | Wahrenberg | G06T 15/506 345/424 |
| 2020/0120328 | A1* | 4/2020 | Hamilton et al. | H04N 13/117 |
| 2021/0145521 | A1* | 5/2021 | Kovtun et al. | G16H 40/67 |
| 2022/0122717 | A1* | 4/2022 | Budz et al. | G06T 7/11 |

OTHER PUBLICATIONS

Hänel, C., Weyers, B., Hentschel, B., and Kuhlen, T. W. "Interactive volume rendering for immersive virtual environments." 2014 IEEE VIS International Workshop on 3DVis (3DVis), 2014, pages 73-74.

Jönsson, D., Sundén, E., Ynnerman, A., and Ropinski, T. "A survey of volumetric illumination techniques for interactive volume rendering." Computer Graphics Forum, 2014, 33(1):27-51.

Marschner, S. and Shirley, P. (2018). "Chapter 8 The Graphics Pipeline: 8.2.3 Using a z-Buffer for Hidden Surfaces." Fundamentals of Computer Graphics, CRC Press, 2018.

Engel, K., Hadwiger, M., Kniss, J. M., Lefohn, A. E., Salama, C. R., and Weiskopf, D. "Real-time volume graphics." ACM SIGGRAPH 2004 Course Notes, 2004, SIGGRAPH.

* cited by examiner

US 11,804,011 B2

1

METHOD AND APPARATUS FOR INTERACTIVE VOLUMETRIC VISUALIZATION

FIELD OF THE DISCLOSURE

The present disclosure is generally related computing systems for data visualization, and more particularly to computing systems for visualizing three-dimensional volumetric models represented by explicit surfaces.

BACKGROUND

Volumetric models are digital models representing three-dimensional objects and structures. Visualizing three-dimensional volumetric models is useful in scientific and engineering data visualization and analytics, and has been a popular topic of investigation in the research of data visualization. A volumetric model represents a three-dimensional object whose internal structures are the focus of visualization and analytics. Therefore, it is insufficient for a visualization to merely depict the outer appearance of the object as seen by an external observer. Examples of volumetric visualization include: anatomy visualization of human and animal bodies, geological visualization of underground mineral structural and compositions, as well as engineering visualization of mechanical structures of gearboxes and other enclosed machines.

Although there is a strong demand of performant interactive volumetric visualization methods in the industry, known methods fall short in visual clarity and/or performance for large and complex volumetric models. Even with latest high-end computers, most existing methods cannot produce three-dimensional visualizations fast enough for an analyst to interactively change a point of view and visualization parameters with large and complex volumetric models. Moreover, many existing methods lack visual clarity, preventing an analyst to precisely tell the structure of the internals of the volumetric models. It is desirable to improve upon the existing approaches by eliminating or mitigating the deficiencies noted above.

SUMMARY OF THE DISCLOSURE

Disclosed is a method and apparatus for enabling interactive visualization of volumetric models. The method involves maintaining a plurality of three-dimensional volumetric models represented by explicit surfaces. In accordance with an embodiment of the disclosure, the method also involves, for a current point of view, generating and displaying images of the volumetric models in a manner that clarifies internal structures by accounting for light attenuation inside the volumetric models as a function of spatial positions of the explicit surfaces. The method also involves, upon receiving user input that adjusts a display variable, repeating the generating and the displaying of the images in accordance with the display variable that has been adjusted, thereby enabling interactive visualization of the volumetric models while simultaneously clarifying the internal structures by accounting for the light attenuation inside the volumetric models.

By accounting for light attenuation inside the volumetric models, the method enables visual clarity for internal structures of the volumetric models beyond their outer appearance. Meanwhile, by using volumetric models represented with explicit surfaces, the method can be performant and fast enough for VR/AR displays. Therefore, this method is a first of its kind that creates visual clarity of internal structures of volumetric models beyond its outer appearance while enabling interactive visualization.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

Introduction

Figure 1:
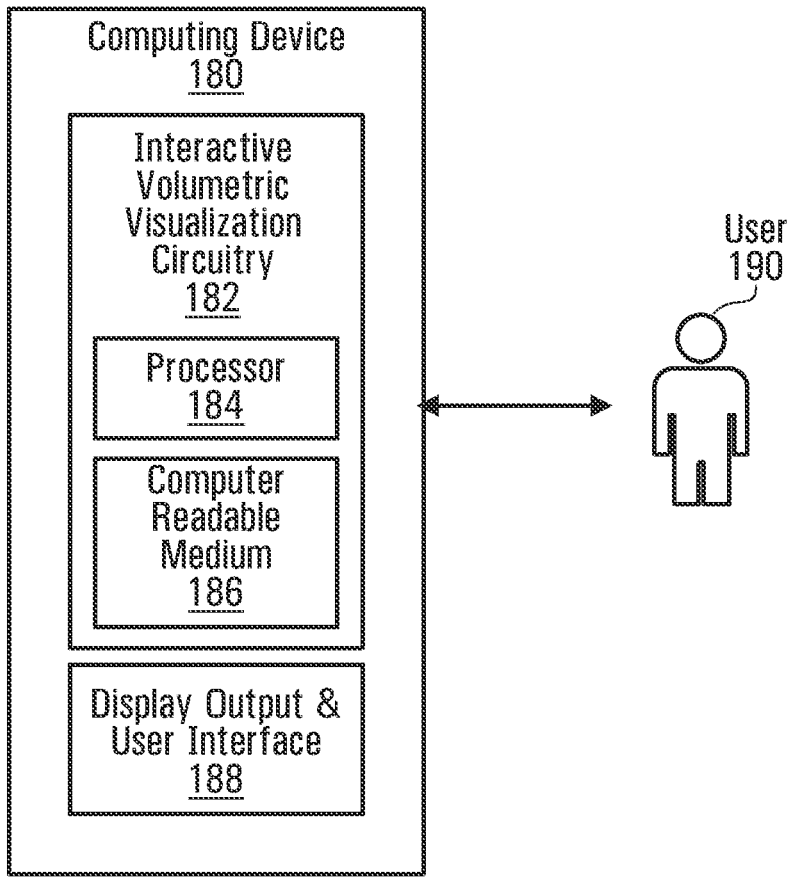
FIG. 1 is a block diagram of a computing device configured to enable interactive visualization of volumetric models.

Referring now to FIG. 1, shown is a computing device 180 configured to enable interactive visualization of volumetric models. The computing device 180 has interactive volumetric visualization circuitry 182. In some implementations, the interactive volumetric visualization circuitry 182 includes a processor 184 that executes software, which can stem from a computer readable medium 186. However, other implementations are possible and are within the scope of this disclosure. In some implementations, the computing device 180 has a display output and user interface 188, which enables a user 190 to interact with the computing device 180. The display output and user interface 188 can for example include a monitor, a keyboard, a touchscreen, a mouse, or any combination thereof. The computing device 180 may have other components that are not shown.

Figure 2:
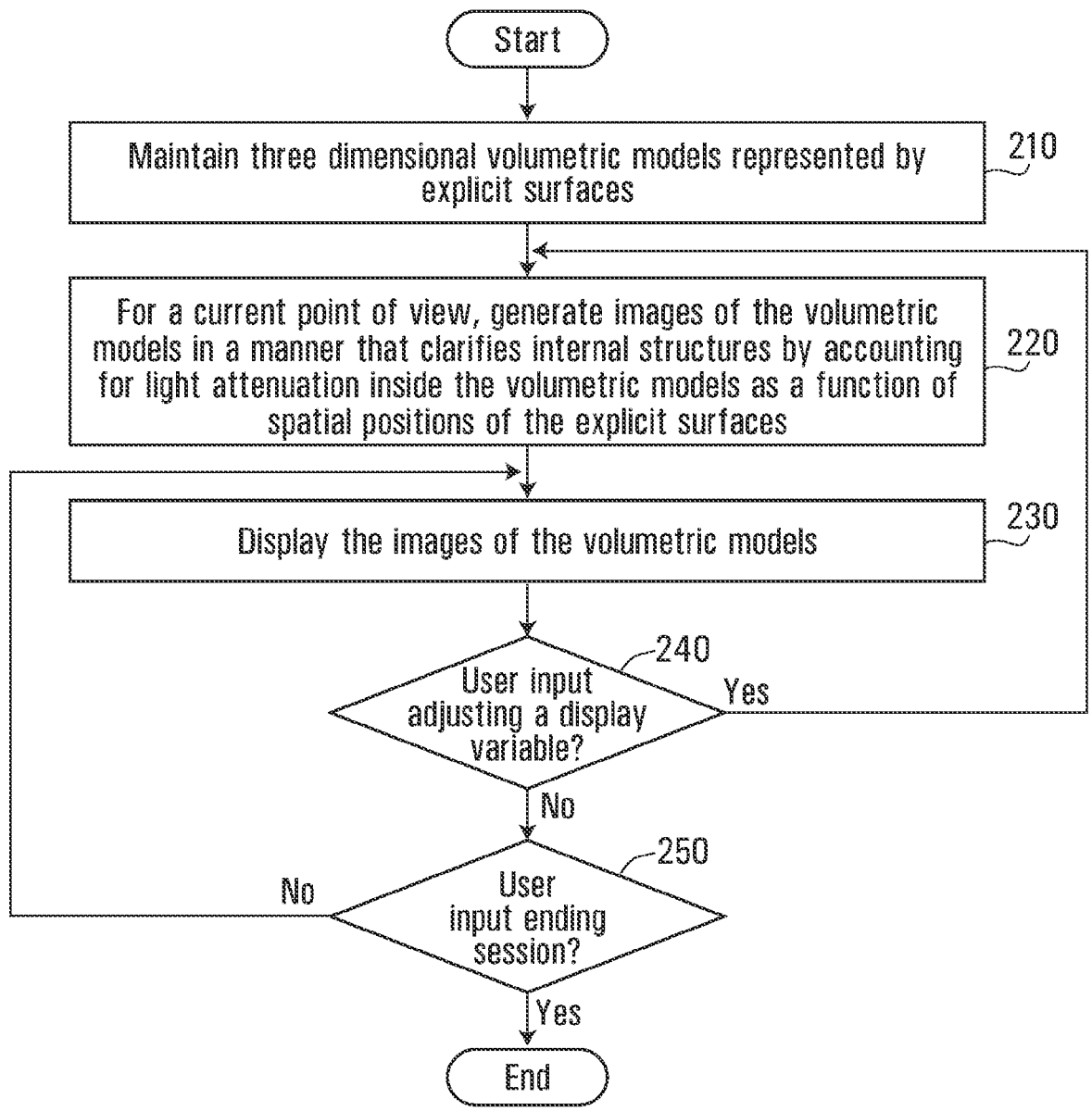
FIG. 2 is a flow chart of a method of enabling interactive visualization of volumetric models.

Operation of the computing device 180 will be described below with reference to FIG. 2, which is a flow chart of a method of enabling interactive visualization of volumetric models. Although the method of FIG. 2 is described below with reference to the computing device 180 of FIG. 1, it is to be understood that the method of FIG. 2 is applicable to other computing devices. In general, the method of FIG. 2 is applicable to any appropriately configured computing device.

At step 210, the computing device 180 maintains three-dimensional volumetric models represented by explicit surfaces. In accordance with an embodiment of the disclosure, at step 220, for a current point of view, the computing device 180 generates images of the volumetric models in a manner that clarifies internal structures by accounting for light attenuation inside the volumetric models as a function of the spatial positions of the explicit surfaces. Furthermore, at step 230, the computing device 180 displays the images, for example using the display output and user interface 188.

Upon receiving user input adjusting a display variable at step 240, the computing device 180 repeats the generating and the displaying of the images in accordance with the display variable that has been adjusted, thereby enabling interactive visualization of the volumetric models while simultaneously clarifying the internal structures by accounting for light attenuation inside the volumetric model. In some implementations, the method continues until user input ending session is received at step 250.

By accounting for light attenuation inside the volumetric models, the method can enable visual clarity for internal structures of the volumetric models beyond their outer appearance. Meanwhile, given that the three-dimensional volumetric models are represented by explicit surfaces, the method can be performant and fast enough for VR/AR displays. This method is a first of its kind that creates visual clarity of internal structures of volumetric models beyond its outer appearance while enabling interactive visualization. In particular, this method addresses shortcomings of existing first category methods and existing second category methods as described below.

According to a first category of volumetric visualization, three-dimensional volumetric models are rendered in the form of discrete samples, such as point clouds, voxels or three-dimensional grids. Discrete sample is a common output format of scanners and other instruments, and is also common in computer simulations. Existing discrete-sample visualizations based on ray-marching or path integral methods can run at around 15 to 25 frames per-second (FPS) with a medium sized dataset on a high-end workstation, which may be considered adequately interactive [Engel et al.[1]]. Nevertheless, such mediocre performance lacks visual fluidity of a typical contemporary 3D rendering and visualization application. For instance, a commonplace 3D computer game usually renders at 60 FPS or higher, and a low FPS in visualization is known to cause motion sickness with Virtual and Augmented Reality (VR/AR) headset displays [Chang et al.[2]]. Moreover, a discrete sample based visualization can have difficulty in keeping its mediocre performance for large datasets or for display outputs having high resolution [Jönsson et al.[3]]. It has been also argued in peer-reviewed literature that this first category of volumetric visualization may not be suitable for VR/AR displays at the current level of technology [Hänel et al.[4]].

[1] Engel, K., Hadwiger, M., Kniss, J. M., Lefohn, A. E., Salama, C. R., and Weiskopf, D. "Real-time volume graphics." ACM SIGGRAPH 2004 Course Notes, 2004, SIGGRAPH.

[2] Chang, E., Kim, H. T., and Yoo, B. "Virtual reality sickness: A review of causes and measurements." International Journal of Human-Computer Interaction, 2020, 36(17):1658-1682.

According to a second category of volumetric visualization, volumetric models can be represented with three-dimensional explicit surfaces. The explicit surfaces include but are not limited to polygonal meshes and parametric surfaces such as spline surfaces. Visualization methods that work with explicit surfaces are typically performant and fast enough for VR/AR displays. They can deliver 90 to 150 FPS in interactive visualization with up-to-date computer graphics hardware, even when many 3D models are involved. However, the second category of volumetric visualization lacks the ability to clarify internal structures of the three-dimensional volumetric models beyond its outer appearance. This is because rendering and visualization methods for explicit surface models were originally designed for visual content productions, such as animated films, visual effects and computer games [Marschner and Shirley[5]]. In visual content production, one primarily depicts an object's outer appearance, while rarely depicts any internal structures. Therefore, existing explicit surface-based methods do not work well in the context of volumetric visualization wherein the internal structure, and not the outer appearance, is the focus for a user.

[3] Jonsson, D., Sunden, E., Ynnerman, A., and Ropinski, T. "A survey of volumetric illumination techniques for interactive volume rendering." Computer Graphics Forum, 2014, 33 (1):27-51.

[4] Hänel, C., Weyers, B., Hentschel, B., and Kuhlen, T. W. "Interactive volume rendering for immersive virtual environments." 2014 IEEE VIS International Workshop on 3DVis (3DVis), 2014, pages 73-74.

[5] Marschner, S. and Shirley, P. (2018). "Chapter 8 The Graphics Pipeline: 8.2.3 Using a z-Buffer for Hidden Surfaces." Fundamentals of Computer Graphics, CRC Press, 2018.

The existing approaches in the first category of volumetric visualization are deficient because they typically have low to mediocre performance even with latest high-end computers, and existing approaches in the second category of volumetric visualization are deficient because they lack an ability to clarify internal structures of a three-dimensional volumetric model. By contract, the method disclosed herein enables visual clarity for internal structures of volumetric models beyond their outer appearance and can be performant and fast enough for VR/AR displays, especially when compared to existing approaches in the first category of volumetric visualization.

Because high-performance and fluid interactive visualizations, as well as VR/AR displays, are critical to develop in industrial data visualization and analytics, there is an industrial knowledge gap about how to provide performant interactive volumetric visualizations without being restricted to the capacity of either the first or second category of existing methods. The present disclosure addresses this industrial knowledge gap by introducing a fast three-dimensional volumetric visualization method that can deliver interactive visualization with visual clarity even when the volumetric data and models are large and complex.

To simplify the presentation of the present disclosure, we use terminologies that are may be used in discussing surface rendering methods for other purposes, such as methods for alpha blending for overlapping transparent surfaces. Nevertheless, the present disclosure is distinct from prior work of surface rendering in at least two aspects with regards to the purposes and the key calculations. First, the method and system presented herein is designed for volumetric data visualization, depicting a solid body containing continuous internal structures. In contrast, most existing surface rendering methods are designed for depicting appearances of the outermost surfaces of objects, whether or not the surfaces are transparent. Second, the method and system presented herein calculates light attenuation continuously throughout the volumetric body being visualized, which is different from prior work of surface rendering. In particular, prior work about alpha blending and transparency calculates light attenuation and reflection only on the surfaces of the three-dimensional models, conforming to their purpose of rendering outer surfaces but not internal structures.

As aforementioned, existing volumetric visualization methods can be divided into two categories, with the first category operating with discrete samples and the second category operating with explicit surfaces. Both discrete samples and explicit surfaces can be effective digital models of real-world volumetric objects. A volumetric model can be converted between discrete samples and explicit surfaces with existing tools known to those ordinarily skilled in the art of volumetric data processing and visualization. The present disclosure does not concern such conversion. With the methods and systems presented herein, it is assumed that three-dimensional volumetric models in the form of explicit surfaces are available, and we describe the new method and apparatus to visualize them interactively.

The explicit surfaces used to represent the volumetric models can take many possible forms. In contrast to discrete samples including point clouds and voxels, explicit surfaces are parametrically defined surfaces in three-dimensional spaces that may have well-defined surface areas. In other words, one can write down formulae, such as a plane's equation, to explicitly describe such a continuous surface in a three-dimensional space. This is in contrast with discrete samples, for example point clouds, whereas one typically cannot put down formulae to describe surfaces corresponding to all the points that can each be at arbitrary positions in the three-dimensional space. In some implementations, the three-dimensional surfaces include polygonal meshes and/or parametric surfaces, such as spline surfaces. The explicit surfaces can take other forms in various implementations, as long as the explicit surfaces can be processed by the rendering pipeline. For example, a typical graphics pipeline can tessellate the polygonal meshes into triangles, and further rasterize the triangles into fragments. There are many other methods to prepare various forms of explicit surfaces to be processed by the rendering pipeline.

There are many possibilities for the display variable that can be adjusted by the user. In many implementations, the mostly adjusted display variable is the current point of view. For instance, the user could adjust current point of view in order to view the volumetric models from a new view. Such adjustment prompts re-generating the images for the new view (i.e. repeating step 220) and displaying the images (i.e. repeating step 230). Other commonly adjusted display variables by users include, but are not limited to: screen resolution, lighting intensity and color, and color of the volumetric models. In many implementations, multiple display variables can be adjusted simultaneously.

There are many possibilities for generating the images as visualizations of the volumetric models. In some implementations, generating each image includes, for each section (e.g. a single pixel or a group of pixels) of an image plane, identifying fragments of the explicit surfaces through which an imaginary line stemming from the current point of view traverses following a direction of view, determining a rendering color for each fragment, and determining an aggregate color as a function of each rendering color and a spatial position of each fragment. The image can be generated based on the aggregate color of each section of the image plane. In some implementations, determining the aggregate color includes accumulating the rendering color for each fragment to produce an accumulated rendering color, normalizing the accumulated rendering color to produce a normalized color, and blending the normalized color with a background. Further example details of how images can be generated are provided below with reference to FIGS. 3 to 8.

The illustrated examples described herein focuses on software implementations in which software is executed by the processor 184 of the computing device 180. For software implementations, the software would be stored on a non-transitory computer readable medium. Therefore, according to an embodiment of the disclosure, there is provided a non-transitory computer readable medium having recorded thereon statements and instructions that, when executed by the processor 184 of the computing device 180, implement a method as described herein. The non-transitory computer readable medium can be the computer readable medium 186 of the computing device 180 shown in FIG. 1, or some other non-transitory computer readable medium. The non-transitory computer readable medium can for example include an SSD (Solid State Drive), a hard disk drive, a CD (Compact Disc), a DVD (Digital Video Disc), a BD (Blu-ray Disc), a memory stick, or any appropriate combination thereof.

There are many possibilities for the processor 184 of the computing device 180. The processor 184 can include a CPU (Central Processing Unit) and/or a GPU (Graphics Processing Unit). An example of this is provided below with reference to FIG. 3. However, other implementations are possible and are within the scope of this disclosure. It is noted that other implementations can include additional or alternative hardware components, such as any appropriately configured FPGA (Field-Programmable Gate Array), ASIC (Application-Specific Integrated Circuit), and/or microcontroller, for example. In addition, software can be executed on a virtualized computer on a cloud or web-based server, wherein multiple software instances are executed on a single physical computing device. More generally, the interactive volumetric visualization circuitry 182 of the computing device 180 can be implemented with any suitable combination of hardware, software and/or firmware.

Another Example Computing Device

Figure 3:
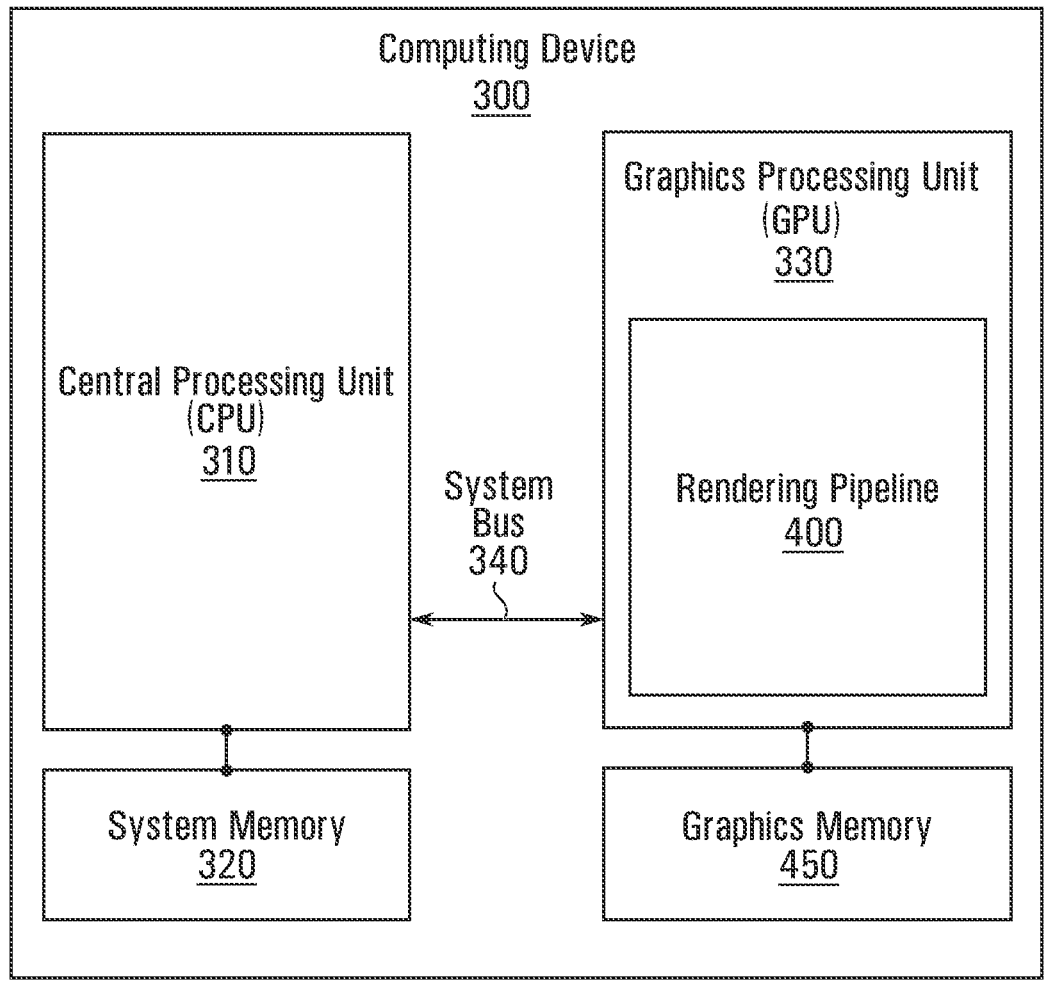
FIG. 3 is a block diagram of another computing device configured to enable interactive visualization of volumetric models.

Referring now to FIG. 3, shown is a block diagram of another example computing device 300 configured to enable interactive visualization of a volumetric model. The computing device 300 includes, but is not limited to, a CPU 310, system memory 320, a GPU 330, graphics memory 450 coupled to the GPU 330, and a highspeed system bus 340. The GPU 330 includes at least one graphics pipeline 400 used to execute the processes described herein. In other implementations, the CPU 310, the GPU 330, the system memory 320, the system bus 340, or any combination of them, may be integrated into a single processing unit or a single chipset. A person skilled in the art will recognize that any computing device configured to implement the teachings in the present disclosure falls within the scope of the present disclosure. Computing devices configured to implement the teachings in the present disclosure can have structures different from the computing device 300 shown in FIG. 3, may have additional components, may be attached to a network, be a virtual machine simulated with software on other computing devices, or may differ from the conceptual computing device 300 in other aspects.

Figure 4:
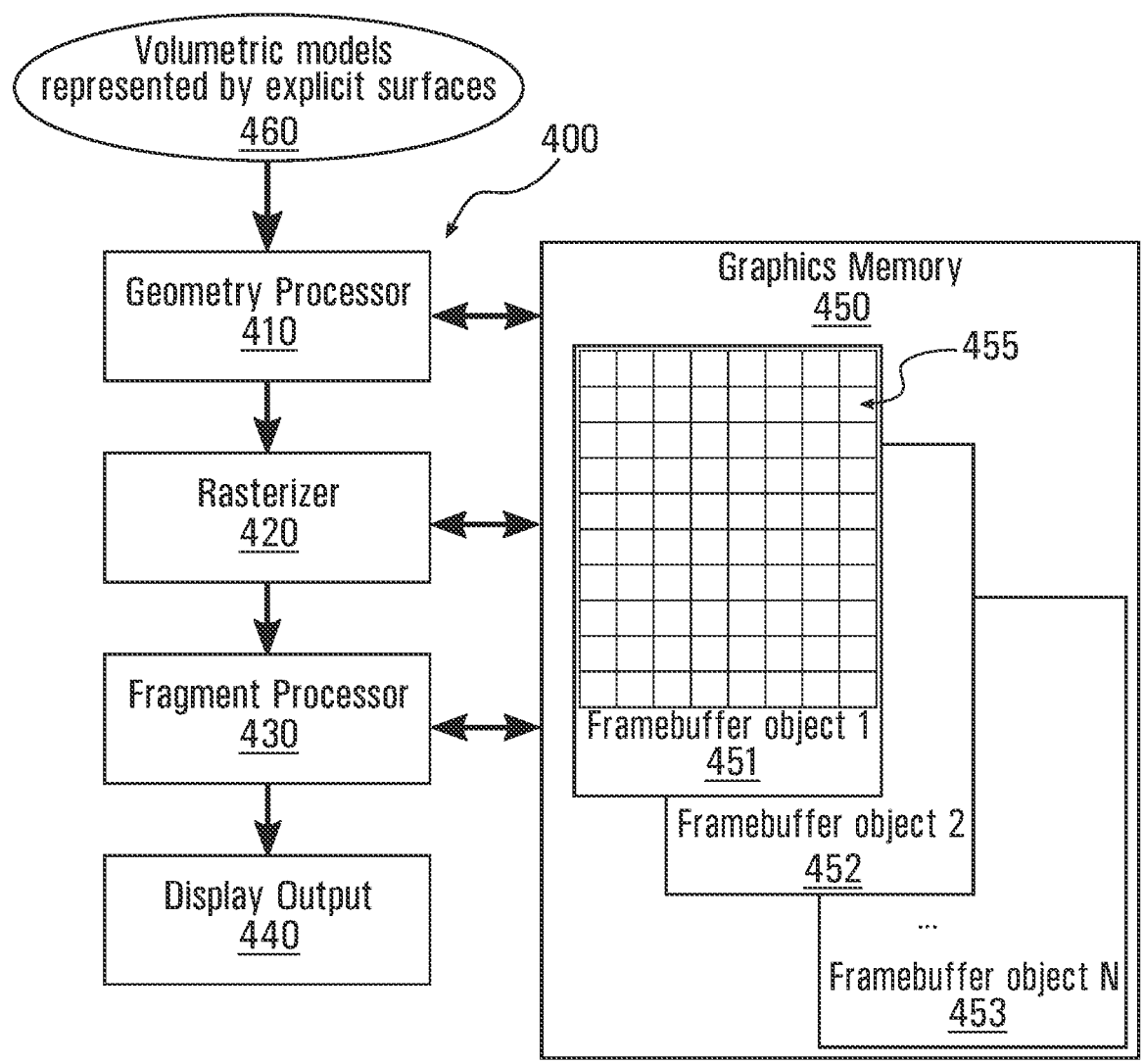
FIG. 4 is a conceptual diagram of a graphics pipeline of the computing device shown in FIG. 3.

Referring now to FIG. 4, shown is a conceptual diagram of the graphics pipeline 400 shown in FIG. 3. The graphics pipeline 400 has at least one geometry processor 410, at least one rasterizer 420, at least one fragment processor 430, and at least one display output 440. The graphics pipeline 400 also includes graphics memory 450 to store runtime data during computation. The graphics memory 450 may include, amongst other data facilities, frame-buffer objects 451 to 453. Each frame-buffer object 451 to 453 contains a two-dimensional array of homogeneous data elements 455. Typically, data elements of frame-buffer objects match the dimension and size of the pixels of the display output 440. In other words, a typical frame-buffer object has the same number of data elements as the number of pixels in the display output 440 with same two-dimensional layout; each pixel can be associated with a data element in the frame-buffer object with the same two-dimensional coordinate for locating the pixel in the display output 440.

The graphics pipeline 400 takes three-dimensional volumetric models 460 represented by explicit surface as input. As noted above, the explicit surfaces can take many forms in various implementations, as long as they can be processed by the rendering pipeline 400. The geometry processor 410 transforms and arranges the volumetric models 460 with regards to a current point of view. The rasterizer 420 breaks down the explicit surfaces of the volumetric models 460 into fragments. Each fragment corresponds to one pixel of the display output 440, although other implementations are possible in which each fragment corresponds to a section of the display output 440 which could include several pixels. The fragment processor 430 then calculates parameters used to display each pixel for the display output 440. Example parameters include red, green and blue light intensities for each pixel using an RGB display model.

The terms fragment and pixel are sometimes used interchangeably in the literature, and they can denote a few different meanings in different contexts. Here, we use the term fragment and pixel defined as follows. A fragment is a small part of the three-dimensional explicit surfaces of the volumetric models, produced by the rasterizer 420. A pixel is a data element used to display a colored light point on a digital display, which is usually a triplet of red, blue and green light intensity values, as well as associated two-dimensional coordinates of that element on the display.

A person skilled in the art will recognize that the present disclosure is not limited by the conceptual drawing of FIG. 4. In particular, the teachings of the present disclosure are equally applicable for graphics pipelines that are not hardware accelerated, or having more than one geometry, rasterizer, or fragment processors. Subsequent disclosures for an "Example Embodiment" and "Another Embodiment" are provided below with reference to the graphics pipeline 400 of FIG. 4. However, as noted above for FIG. 1, any suitable combination of hardware, software and/or firmware can be utilized.

Example Embodiment

Figure 5:
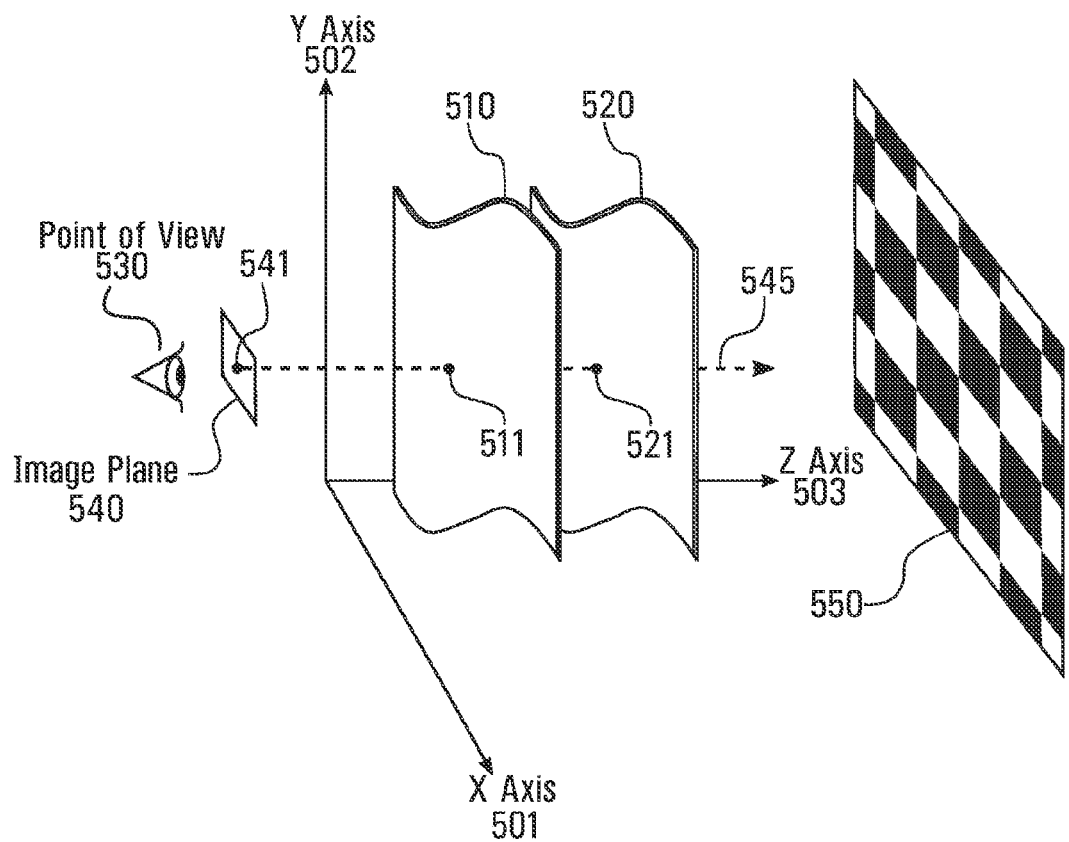
FIG. 5 is a schematic of a volumetric model that includes at least two explicit surfaces, an image plane for a point of view, and a background, in accordance with an embodiment of the disclosure.

Referring now to FIG. 5, shown is a schematic of a volumetric model that includes at least two explicit surfaces 510 and 520, an image plane 540 for a point of view 530, and a background 550, in accordance with an embodiment of the disclosure. In this figure, the explicit surfaces 510 and 520 include a first explicit surface 510 which represents a surface of the volumetric model closest to the current point of view 530, and a second explicit surface 520 which represents a surface of the volumetric model farthest to the current point of view 530. The explicit surfaces 510 and 520 define boundaries of a single volume for the volumetric model. In industrial applications, a typical volumetric model may include many more surfaces to describe its internal structures in addition to the nearest and farthest surfaces drawn here. Furthermore, the background 550 can take a variety of forms, including but not limited to a solid color, an image, or additional three-dimensional models that are not volumetric models in the visualization. The present disclosure can also be practiced without a background at all. Nevertheless, in typical industrial applications, there usually is some form of background as a visual context of the volumetric visualization.

A coordinate system is setup, including an x-axis 501, a y-axis 502, and a z-axis 503, such that an image plane 540 corresponding to the current point of view 530 is placed at an origin 600 of the z-axis 503 (i.e. z=0) and the z axis 503 is parallel to the direction of the current view 545. The graphics pipeline 400 rasterizes the explicit surfaces 510 and 520 of the volumetric model into fragments, and projects these fragments onto the image plane 540 following a geometric transformation. In particular, a first fragment 511 from the first explicit surface 510 and a second fragment 521 from the second explicit surface 520 are projected onto a single pixel 541 on the image plane 540, with different distances on a direction of view 545. Then, the fragments 511 and 521, and the background 550, are rendered and blended into the single pixel 541 in the volumetric visualization.

Figure 6:
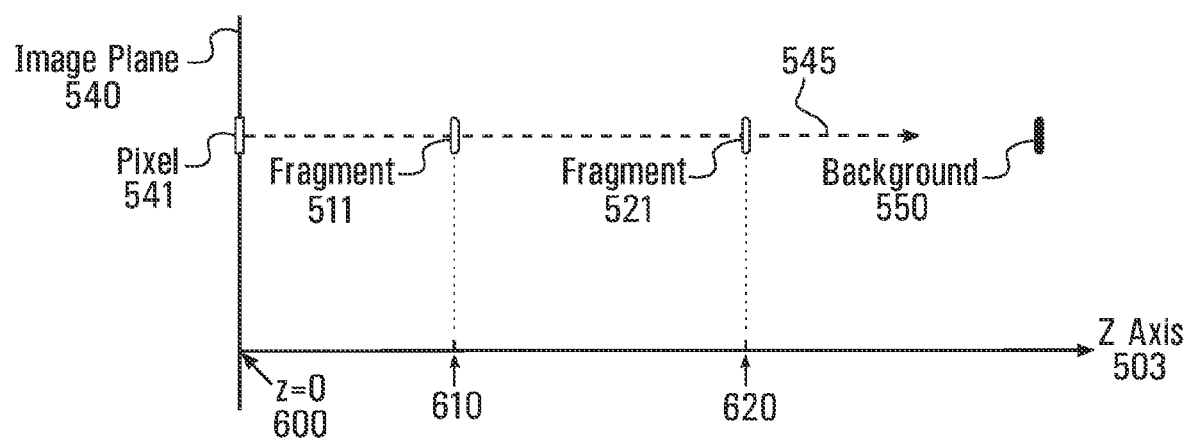
FIG. 6 is a graph corresponding to the embodiment of FIG. 5, showing a pixel on the image plane, surface fragments of the volumetric model, and a background fragment.

Referring now to FIG. 6, shown is a graph corresponding to the embodiment of FIG. 5, showing the pixel 541 on the image plane 540, the surface fragments 511 and 521 of the volumetric model, and a background fragment 350. This graph provides a close-up view in the direction of view 545 for the pixel 541 on the image plane 540. The first fragment 511 is shown at a first z-coordinate 610 while the second fragment 521 is shown at a second z-coordinate 620. The z-coordinates represent distances of the fragments 511 and 521 to the image plane 540 in the direction of view 545. For any given fragment, the distance between the fragment and the image plane 540 in the direction of view 545 is called the fragment's z-distance. Therefore, the z-distance of the first fragment 511 is the first z-coordinate 610, and the z-distance of the second fragment 521 is the second z-coordinate 620. In some implementations, the graphics pipeline 400 produces the background fragment 350 from a variety forms of the background 550, by directly using a background color, sampling into a background image, rasterizing background models, or any means appropriate for a specific form of background being used.

Note that the image plane 540 and the current point of view 530 are not normally co-located. In particular, while the current point of view 530 is shown at the origin (i.e. z=0) in FIG. 6, the current point of view 530 can be to the left of the origin (i.e. z<0) which is not shown. However, the image plane 540 is associated with the current point of view 530, such that if there is a change to the current point of view 530, the image plane 540 would also change. Also note that, while one image plane 540 is shown, there could be a plurality of image planes in other implementations. For example, for VR implementations, there can be a first image plane for generating images for a left eye, and a second image plane for generating images for a right eye. Other implementations are possible and are within the scope of the disclosure. More generally, there is provided at least one image plane for any given point of view.

Figure 7:
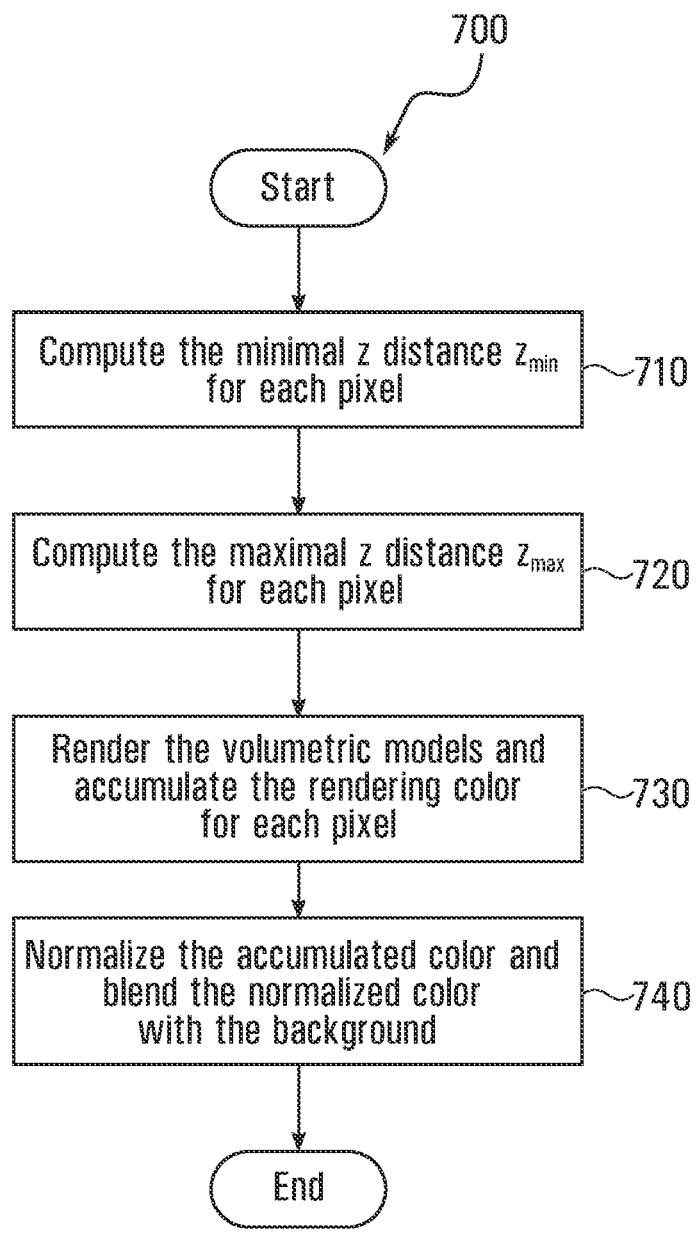
FIG. 7 is flow chart of a volumetric visualization method, in accordance with the embodiment of FIG. 5.

Referring now to FIG. 7, shown is a flow chart of a volumetric visualization method 700, in accordance with the embodiment of FIG. 5. Although the volumetric visualization method 700 of FIG. 7 is described below with reference to the graphics pipeline 400 of FIG. 4, it is to be understood that the volumetric visualization method 700 of FIG. 7 is applicable to other graphics pipelines. In general, the volumetric visualization method 700 of FIG. 7 is applicable to any appropriately configured computing device. In addition, it is to be understood that the volumetric visualization method 700 is very specific and is provided merely as an example, such that other implementations are possible with varying algorithm flows from that shown.

At step 710, the graphics pipeline 400 computes the closest fragment in the volumetric model from the point of view 530 for each pixel. In other words, for each pixel of the image plane 540, the graphics pipeline 400 finds a fragment in the volumetric model that is projected onto this pixel and has the minimal z-distance. The minimal z-distance is denoted as $z_{min}$ for this pixel. For example, the fragment with the minimal z-distance in the volumetric model of FIG. 5 is the first fragment 511. Therefore, $z_{min}$ of the pixel 541 equals the first z-coordinate 610. In some implementations, the graphics pipeline 400 stores the minimal z-distance $z_{min}$ of every pixel in the graphics memory 450 for later calculations.

A person skilled in the art can accomplish step 710 using the graphics pipeline 400 in a few ways. For example, one can render the volumetric model onto an empty frame-buffer object and set a depth test function of the graphics pipeline 400 to be less-equal, then output the fragments' z-distances onto the frame-buffer object. After the rendering, the frame-buffer object contains the minimal z-distance $z_{min}$ for each pixel on the image plane. We may call frame-buffer object that contains $z_{min}$ for every pixel as the "min buffer". There are other possible ways for one to compute and store $z_{min}$, and the example given above is meant to facilitate reproduction of the new method, but not to limit the scope of this disclosure. Regardless of method used, the minimal z-distances $z_{min}$ for each pixel are computed.

It is noted that, to find the minimal z-distance $z_{min}$ for each pixel on the image plane, it is likely that the volumetric model would be rendered once with the graphics pipeline 400. Likewise, according to steps 720 & 730 discussed below, the volumetric model may be rendered once in these steps as well. In other words, steps 710 to 730 contain a rendering pass of the volumetric model.

At step 720, the graphics pipeline 400 finds the farthest fragment in the volumetric model from the point of view 530 for each pixel. In other words, for each pixel of the image plane 540, the graphics pipeline 400 finds a fragment in the volumetric model that is projected onto this pixel and has the maximum z-distance. The maximal z-distance is denoted as $z_{max}$ for this pixel. For example, the fragment with maximum z-distance in the volumetric model in FIG. 5 is the second fragment 521. Therefore, $z_{max}$ of the pixel 541 equals to the second z-coordinate 620. In some implementations, the graphics pipeline 400 stores the maximal z-distance $z_{max}$ of every pixel in the graphics memory 450 for later calculations.

Similar to step 710, step 720 can be implemented, amongst other ways, using a rendering pass of the volume model with a depth test function of the graphics pipeline 400 set to greater-equal, and output the fragments' z-distances onto another empty frame-buffer object. After the rendering, the frame-buffer object contains the maximal z-distance $z_{max}$ for each pixel on the image plane. We may refer this frame-buffer object that contains $z_{max}$ for every pixel as the "max buffer".

At step 730, the graphics pipeline 400 renders the volumetric model in another rendering pass and accumulates all fragments' rendering colors for each pixel. There are two sub-steps in this step. First, the graphics pipeline 400 computes every fragment's rendering color. Second, the graphics pipeline 400 blends the rendering colors together for each pixel to create the volumetric visualization for the volumetric model. These two sub-steps are detailed below.

In the first sub-step of step 730, the graphics pipeline 400 computes a rendering color for every fragment in the volumetric model. This sub-step can be implemented with any appropriate surface rendering method. In some implementations, the graphics pipeline 400 uses a Lambertian diffuse shading model, combined with parameters of a directional light, a surface albedo reflectance, and a surface normal for each fragment. The Lambertian shading model can be expressed using the following formula:

$$c_f = k_l c_a c_l (\vec{L} \cdot \vec{N}),$$

wherein $c_f$ is the rendering color for a fragment, $k_l$ is a diffuse coefficient, $c_a$ is the surface albedo reflectance, $c_l$ is a light intensity, $\vec{L}$ is a direction of the light, and $\vec{N}$ is the surface normal.

The present disclosure is not limited to the Lambertain diffuse shading model which is described merely as an example. One may implement any appropriate method to compute the fragment rendering colors for the volume model as appropriate in particular implementations and application contexts. Other commonly used methods for computing the fragment rendering color in data visualization includes, but are not limited to, directly using a surface color without a lighting calculation, or using the Blinn-Phong reflection model. Regardless of the method used, a rendering color is computed for a fragment in the first sub-step of step 730.

In the second sub-step of step 730, the graphics pipeline 400 blends all rendering colors together, with a weight parameter w multiplied onto each fragment's rendering color. We may call this weight parameter w as the accumulation weight of the fragment. The accumulation weight is a parameter determined by a location of the fragment inside the volumetric model. More specifically, the accumulation weight w of a fragment is calculated according to a distance between the fragment and the point of view 530 in the direction of the view 545, and the $z_{min}$ of the pixel onto which the fragment is projected. In some implementations, values of the $z_{min}$ for every pixel on the image plane are calculated and stored in step 710.

In some implementations, the graphics pipeline 400 calculates the accumulation weight using a Beer-Lambert absorption law, assuming a uniform attenuation of light inside the volumetric model, using the following formula:

$$w = 1 - e^{-ul},$$

wherein w is the accumulation weight, u is a constant Beer-Lambert attenuation coefficient, and l is an optical path length for light to travel from a fragment towards the point of view 530 inside the volumetric model. The optical path length l for a fragment can be calculated by subtracting $z_{min}$ from the z-distance of the fragment.

For example, in FIG. 5, an optical path length $l_{521}$ of the second fragment 521 is a distance between the z-coordinate 610 of the first fragment 511, which corresponds to $z_{min}$, and the z-coordinate 620 of the second fragment 521. Therefore, to calculate the accumulation weight for the first fragment 521, the graphics pipeline 400 can subtract the z-coordinate 610 of the first fragment 511 (i.e. $z_{min}$) from the z-coordinate 620 of the second fragment 521 (i.e. $z_{620}$) to obtain the optical path length $l_{521}$ for the second fragment 521, using the Beer-Lambert formula as $w_{521} = 1 - e^{-u(z_{620} - z_{min})}$ The present disclosure is not limited to using the Beer-Lambert absorption law to calculate the accumulation weight parameter w, as other methods can be employed to calculate an accumulation weight parameter according to a fragment's spatial location inside the volumetric model. An effect of using an accumulation weight w is to reduce the intensity of a fragment's rendering color according to the amount of light absorbed inside the volumetric model, and to visually depict the fragment's position inside the volumetric model.

Next, for each pixel, the graphics pipeline 400 adds together all fragment colors $c_f$ multiplied by the corresponding accumulation weight w of each fragment. In some implementations, the graphics pipeline 400 stores the summation of the multiplied fragment colors $\Sigma wc_f$ as well as the summation of all accumulation weights $\Sigma w$ in the graphics memory 450 for later calculation.

There are many ways to implement step 730, depending on particular applications. As a non-limiting example, step 730, including both its sub-steps, can be implemented in one rendering pass of the volumetric model. In this rendering pass, the graphics pipeline 400 can sample the min buffer from step 710 to obtain $z_{min}$ for each pixel, then calculate rendering color $c_f$ and accumulation weight w for a fragment shader. Next, a blending mode of the graphics pipeline 400 can be set to 'Add', and the graphics pipeline 400 can output a multiplied fragment color $wc_f$ and the accumulation weight w of each fragment from the fragment shader into two channels of a new frame-buffer object. In this way, the summation of the multiplied fragment colors $\Sigma wc_f$ and the summation of the accumulation weights $\Sigma w$ for each pixel are recorded in this new frame-buffer objects after this rendering pass. The frame-buffer objects storing the multiplied fragment colors $\Sigma wc_f$ and the accumulation weights $\Sigma w$ is called the "accumulation buffer".

At step 740, the graphics pipeline 400 normalizes the summation of the fragment colors and blends the volumetric visualization with a background. There are many ways to implement this step depended on the application scenario. In some implementations, this step may include two sub-steps as described below.

In the first sub-step of step 740, the graphics pipeline 400 normalizes the rendering color of the volumetric model for each pixel, dividing the summation of the weighted fragment color by the summation of the accumulation weight. In other words, the graphics pipeline 400 calculates a normalized rendering color as $$c_v = \frac{\Sigma wc_f}{\Sigma w},$$

wherein $c_v$ is the normalized rendering color of the volumetric model before blending with a background, $\Sigma wc_f$ is the summation of the multiplied fragment colors, and $\Sigma w$ is the summation of the accumulation weights.

In the second sub-step of 740, for each pixel, the graphics pipeline 400 calculates another blending weight $w_{all}$ for all the volumetric models as a whole. Then the normalized rendering color $c_v$ is blended with a background color $c_{bk}$ using the blending weight $w_{all}$. The final pixel color $c_{pixel}$ of the volumetric visualization is therefore calculated as $$c_{pixel} = w_{all} c_v + (1 - w_{all}) c_{bk}$$

The blending weight $w_{all}$ for all the volumetric model is calculated based on spatial position and the extent (i.e. $z_{max}$ and $z_{min}$) of a volumetric model, and can be calculated in many ways that suit specific application contexts. As a non-limiting example, the Beer-Lambert law can be used to calculate light attenuation between the two fragments with the minimal and maximal z-distances, and use it as the blending weight $w_{all}$ for all the volumetric model. In other words, the Beer-Lambert law is applied using the optical path length equal to the distance between the two fragments with the minimal and maximum z-distances for each pixel:

$$w_{all} = 1 - e^{-ul}, l = z_{max} - z_{min}.$$

In FIGS. 5 and 6, the optical path length is the distance between the two fragments 511 and 521, corresponding to the difference between the z-coordinate 620 of the second fragment 521 and the z-coordinate 610 of the first fragment 511.

The background 550 of the volumetric visualization can be defined in many ways that suit particular application contexts. In some implementations, the background 550 is a solid color, and the background color $c_{bk}$ used in all calculations is a constant value. In other implementations, the background 550 is a digital image. In this case, the background color $c_{bk}$ can be sampled from this image. In other implementations, the background 550 may be a plural of background three-dimensional models which are not volumetric models. For these implementations, the graphics pipeline 400 can render the background models into a frame-buffer object. Then, the frame-buffer object can be sampled for the background color $c_{bk}$. The present disclosure is not limited to a particular way of defining the background 550 for the volumetric visualization, as other methods can be employed to create the background color $c_{bk}$, as a visual context for the volumetric visualization.

There are many ways to implement step 740, depending on particular applications. As a non-limiting example, step 740 can be implemented as an image-space post-processing step. In such a post-processing step, a few input frame-buffer objects can be assigned as the input to the graphics pipeline 400, and there are no three-dimensional models in the input. The input frame-buffer objects for this step include the min buffer, the max buffer, and the accumulation buffer. The input also includes information about the background, which can be a solid color, a digital image or another frame-buffer object. For each pixel, a fragment shader samples the input frame-buffer objects, and calculates an output color, as follows.

For the first sub-step of step 740, the graphics pipeline 400 samples the summation of the weighted fragment color $\Sigma$ $wc_f$ and the summation of the accumulation weight $\Sigma^w$ from the accumulation buffer, then calculate the normalized rendering color of the volumetric model $c_v$. For the second sub-step of step 740, the graphics pipeline 400 samples $z_{min}$ and $z_{max}$ from the min buffer and the max buffer to calculate the blending weight for all the volumetric model $w_{all}$. The graphics pipeline 400 then blends the normalized color of the volumetric model $c_v$ with the background $c_{bk}$ with the blending weight $w_{all}$, and output the pixel color $c_{pixel}$ to the display output 440.

Another Embodiment

Figure 8:
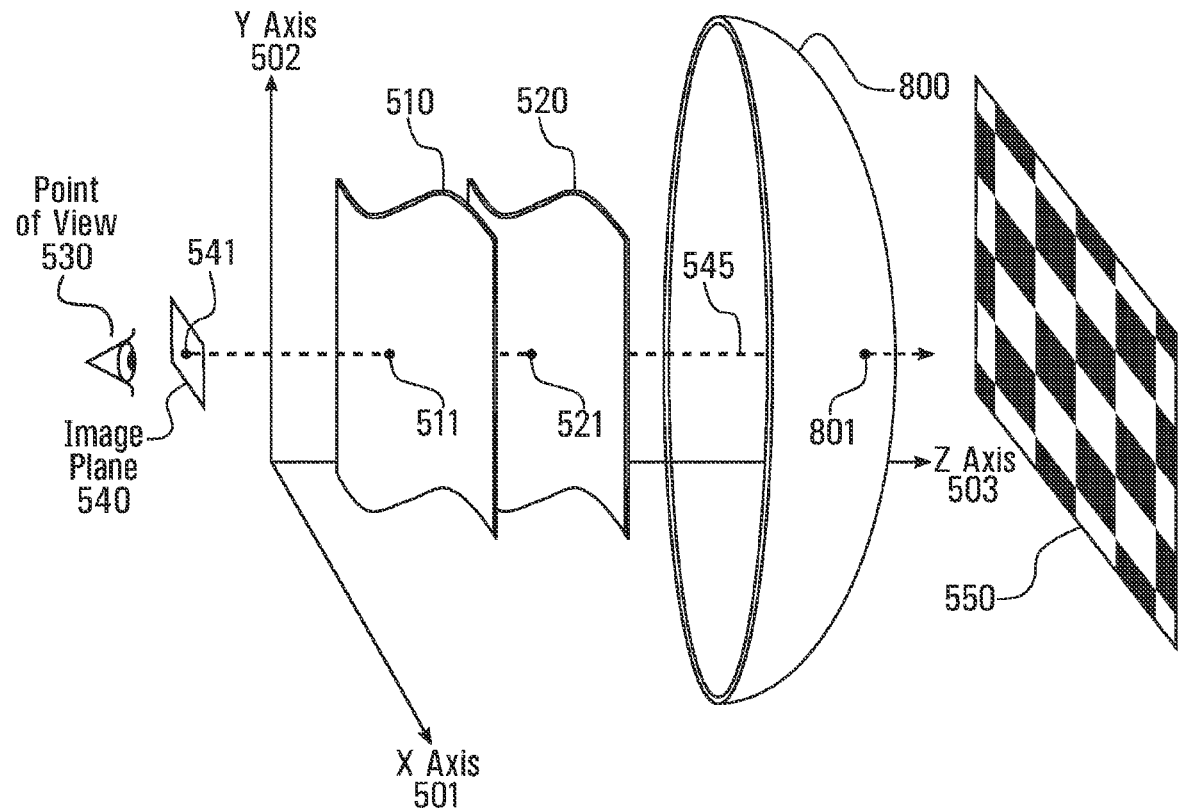
FIG. 8 is a schematic of a volumetric model with addition of an envelope surface, in accordance with another embodiment of the disclosure.

Referring now to FIG. 8, shown is a schematic of a volumetric model with addition of an envelope surface 800, in accordance with another embodiment of the disclosure. The addition of the envelope surface 800 can improve the quality and performance of the visualization in some applications, for example, when the volumetric models are spatially disconnected and scattered. The envelope surface 800 is a visually smooth and closed surface that encapsulates the volumetric model in the visualization, but itself is not a part of the volumetric model being visualized. One way to create the envelope surface 800 is to find a smallest sphere that encapsulates the volumetric model in the visualization. One can also sculpt a three-dimensional surface that more tightly encapsulates the volumetric model in the visualization with any three-dimensional modeling software tools. The present disclosure is not limited to the shape of the envelope surface 800 or the method of creating the envelope surface 800. Regardless of shape and method used, the envelope surface 800 is a closed surface that encapsulates the volumetric model and can be used to improve the quality of the visualization.

Figure 9:
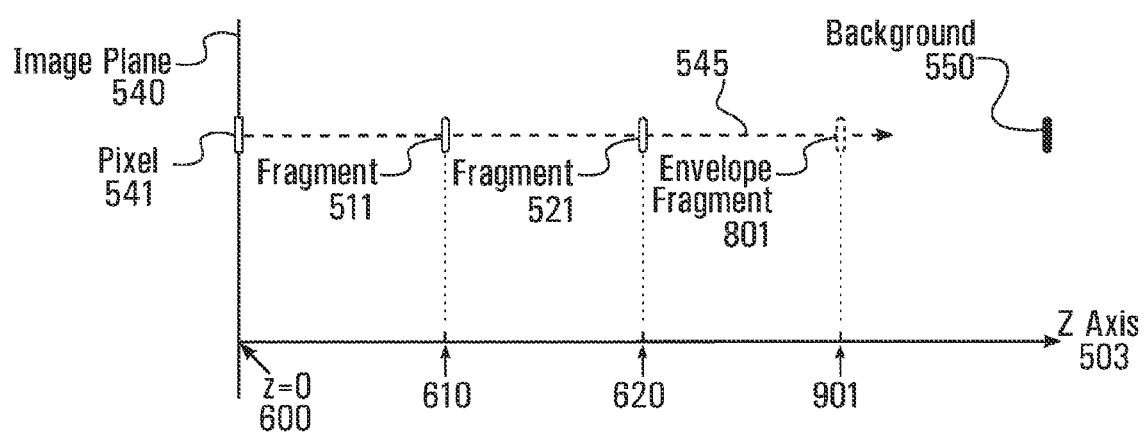
FIG. 9 is a graph corresponding to the embodiment of FIG. 8, showing a pixel on the image plane, surface fragments of the volumetric model, a fragment from the envelope surface, and a background fragment.

Referring now to FIG. 9, shown is a graph corresponding to the embodiment of FIG. 8, showing a pixel 541 on the image plane 540, surface fragments 511 and 521 of the volumetric model, an envelope fragment 801 from the envelope surface 800, and a background fragment 350. This graph provides a close-up view in the direction of the view 545 for the pixel 541 on the image plane 540. The difference between FIG. 9 and FIG. 6 is the addition of the envelope fragment 801 in the direction of the view 545. The envelope fragment 801 is produced by rasterizing the envelope surface 800 in the graphics pipeline 400. It has a z-distance greater than any fragment from the volumetric model.

It is to be understood that FIGS. 8 and 9 illustrate only a portion of the envelope surface 800 and its fragment 801 behind the volumetric model with respect to the point of view 530. This is because only the portion of the envelope surface 800 and its fragment 801 behind the volumetric model are relevant to calculations for the visualization. Therefore, any portion of the envelope surface 800 and any fragments that are in front of the volumetric model are omitted from the drawing. Because the envelope surface 800 is a closed surface that encapsulates all of the volumetric model, we can always find a portion of it behind the volumetric model, such as the explicit surfaces 510 and 520, from any point of view. More precisely speaking, for every pixel 541 of the image plane 540, a direction of the view 545 that starts from the point of view 530 and passes through the pixel 541 always intersects the envelope surface 800 at least once at a greater distance than all intersections with the volumetric model, assuming the direction of view 545 intersects with the volumetric model at least once.

Figure 10:
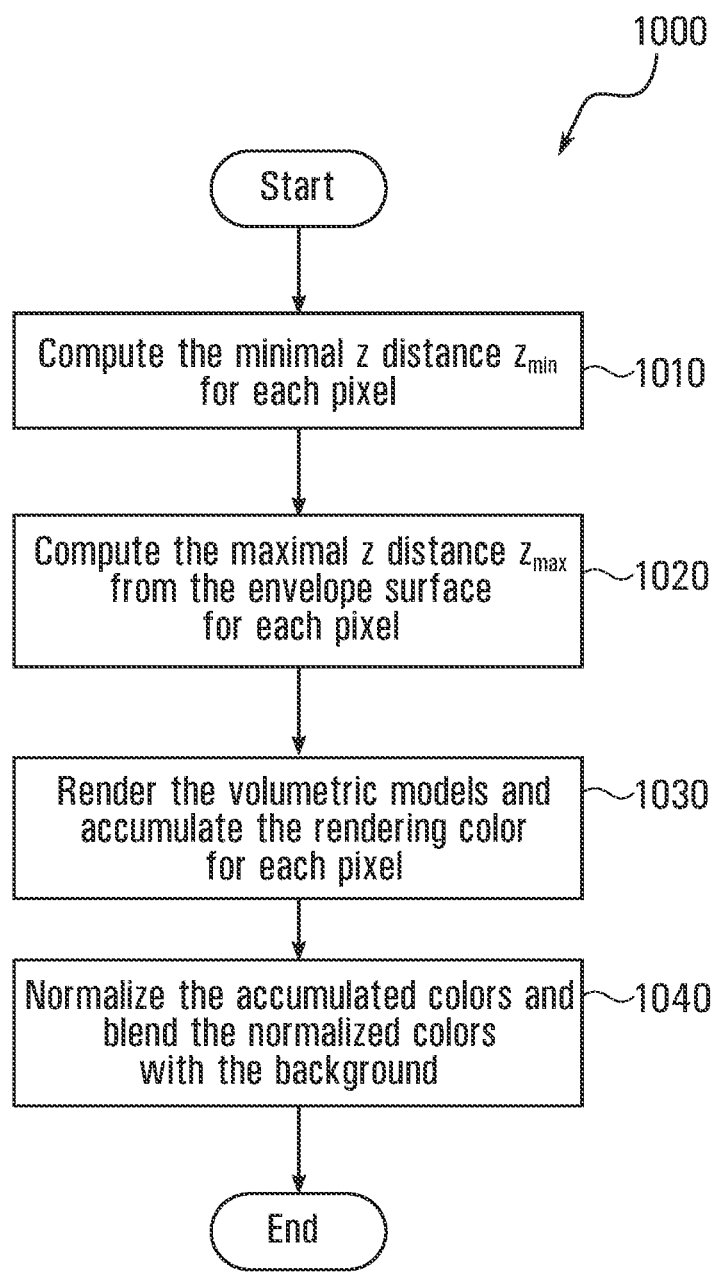
FIG. 10 is flow chart of a volumetric visualization method, in accordance with the embodiment of FIG. 8.

Referring now to FIG. 10, shown is a flow chart of a volumetric visualization method 1000, in accordance with the embodiment of FIG. 8. The volumetric visualization method 1000 of FIG. 10 is similar to the volumetric visualization method 700 of FIG. 7, such that steps 1010, 1030 and 1040 are substantially the same as steps 710, 730 and 740. However, the volumetric visualization method 1000 of FIG. 10 differs in how the maximal z-distance $z_{max}$ is computed at step 1020. In particular, instead of finding a fragment from the volumetric model with a maximum z-distance for each pixel, the rendering pipeline 400 finds the envelope fragment 801 from the envelope surface 800 with a maximum distance. For example, in FIG. 9, the maximal z-distance $z_{max}$ corresponds to the z-coordinate 901 of the envelope fragment 801. In some implementations, the graphics pipeline 400 stores the maximal z-distance $z_{max}$ of every pixel in the graphics memory 450 for later calculations.

There are many ways to implement step 720, including but not limited to setting a depth test function of the graphics pipeline 400 to greater-equal, rendering the envelope surface, and outputting fragments' z-distances onto a new framebuffer object, which can be used as the max buffer in later calculations. Using the envelope surface 800 instead of the volumetric model to compute the max buffer can improve performance and quality of the visualization in some applications. The performance is improved thanks to the fact that computing the maximal z distance from the envelope surface 1020 is typically faster than computing the maximal z distance from the volumetric models 720, because an envelope surface is typically simpler and contains less data than the volumetric models to be visualized.

Conclusion

Disclosed is a method for enabling interactive visualization of three-dimensional volumetric models represented by explicit surfaces. For each pixel, we first find the fragments from a volumetric model with minimal and maximal z-distances, $z_{min}$ and $z_{max}$, and record these z-distances. These two parameters define a spatial extent and boundary of the volumetric models with respect to a given point of view for each pixel. A blending weight of every fragment in the volumetric model can then be computed from a fragment's spatial position with respect to this spatial extent and boundary. We then blend all fragments from the volumetric model together using a summation and normalization process, and blend the normalized color with a given background using a blending weight calculated from the spatial extent and boundary of all the volumetric models in visualization. In another embodiment, we add an envelope surface for the calculation of the spatial extent and boundary, which can improve the performance and quality of the visualization in some applications.

The present disclosure introduces a technical breakthrough in rendering and visualizing a volumetric model with complex internal structures beyond an outermost surface. Existing rendering and visualization methods for depicting overlapping fragments tend to rely on generating a relative order of fragments, either by explicit fragment sorting, or through stochastic and heuristic methods. By considering the fragments as parts of a volumetric body wherein light attenuation happens continuously inside the volume, instead of only happening on the surfaces, we eliminate the problem of fragment ordering entirely. The blending weights of fragments can be directly derived from geometry (i.e. spatial coordinates). A relative order of fragments in a view space is not involved in the blending at all. In turn, it can enable the rendering and visualization for overlapping explicit surfaces using a small, constant number of rendering passes, regardless of the complexity of the models. The method is entirely deterministic and stably depicts all fragments throughout the volumetric models, without using stochastic or heuristic methods.

Numerous modifications and variations of the present disclosure are possible in light of the above teachings. It is therefore to be understood that within the scope of the appended claims, the disclosure may be practised otherwise than as specifically described herein.

We claim:

1. A method for enabling interactive visualization, comprising:
   maintaining a plurality of three-dimensional volumetric models represented by explicit surfaces;
   for a current point of view, generating and displaying images of the volumetric models in a manner that clarifies internal structures by accounting for light attenuation inside the volumetric models as a function of spatial positions of the explicit surfaces; and
   upon receiving user input that adjusts a display variable, repeating the generating and the displaying of the images in accordance with the display variable that has been adjusted, thereby enabling interactive visualization of the volumetric models while simultaneously clarifying the internal structures by accounting for the light attenuation inside the volumetric models;
   wherein the images are generated in accordance with at least one image plane having a plurality of sections, and wherein generating each image comprises, for each section of the at least one image plane, identifying fragments of the explicit surfaces through which an imaginary line stemming from the current point of view traverses following a direction of view, determining a rendering color for each fragment, and determining an aggregate color as a function of each rendering color and a spatial position of each fragment, and generating the image based on the aggregate color of each section of the at least one image plane;
   wherein the aggregate color is determined by accumulating the rendering color for each fragment to produce an accumulated rendering color, normalizing the accumulated rendering color to produce a normalized color, and blending the normalized color with a background; and
   wherein generating each image comprises:
      for each section of the at least one image plane, identifying which fragment has a minimal distance from the at least one image plane, and calculating the minimal distance;
      for each section of the at least one image plane, identifying which fragment has a maximal distance from the at least one image plane, and calculating the maximal distance;
      for each fragment, computing the rendering color;
      for each fragment, computing an accumulation weight according to a spatial position of the fragment based on the minimal distance and the maximal distance;
      for each section of the at least one image plane, multiplying the accumulation weight with the rendering color for each fragment to produce a multiplied rendering color, summing each multiplied rendering color to produce a summed multiplied rendering color, and summing each accumulation weight to produce a summed accumulation weight;
      for each section of the at least one image plane, dividing the summed multiplied rendering color by the summed accumulation weight to produce a normalized rendering color;
      for each section of the at least one image plane, calculating a background blending weight according to the spatial position and an extent of the volumetric models based on the minimal distance and the maximal distance;
      for each section of the at least one image plane, blending the normalized rendering color with the background using the background blending weight to produce a blended color; and
      generating the image based on the blended color of each section of the at least one image plane.

2. The method of claim 1, wherein the display variable comprises the current point of view.

3. The method of claim 1, wherein the explicit surfaces representing the three-dimensional volumetric models comprise polygonal meshes and/or parametric surfaces.

4. The method of claim 1, wherein each section of the at least one image plane corresponds to a pixel of the images being displayed.

5. The method of claim 1, wherein an envelope surface encapsulates the volumetric models, and identifying which fragment has the maximal distance from the at least one image plane comprises identifying an envelope fragment of the envelope surface having the maximal distance from the at least one image plane.

6. A non-transitory computer readable medium having recorded thereon statements and instructions that, when executed by a processor of a computing device, implement a method according to claim 1.

7. The non-transitory computer readable medium of claim 6, wherein the processor of the computing device comprises at least one GPU (Graphics Processing Unit).

8. The non-transitory computer readable medium of claim 7, wherein the processor further comprises at least one CPU (Central Processing Unit), and wherein the at least one CPU and the at least one GPU are coupled together via a system bus, and wherein the statements and instructions are executed by a combination of the at least one CPU and the at least one GPU.

9. The non-transitory computer readable medium of claim 6, wherein the display variable comprises the current point of view.

10. The non-transitory computer readable medium of claim 6, wherein the explicit surfaces representing the three-dimensional volumetric models comprise polygonal meshes and/or parametric surfaces.

11. A computing device, comprising:
    a user interface; and
    interactive volumetric visualization circuitry coupled to the user interface and configured to implement a method according to claim 1.

12. The computing device of claim 11, wherein the interactive volumetric visualization circuitry comprises at least one GPU (Graphics Processing Unit).

13. The computing device of claim 12, wherein:
    the at least one GPU comprises at least one rendering pipeline having at least one geometry processor, at least one rasterizer, at least one fragment processor, and at least one display output; and
    the interactive volumetric visualization circuitry further comprises graphics memory coupled to the at least one GPU and having a plurality of frame-buffer objects each having a two-dimensional array of homogeneous data elements corresponding to pixels of display outputs.

14. The computing device of claim 12, wherein the interactive volumetric visualization circuitry further comprises at least one CPU (Central Processing Unit) and system memory coupled to the at least one CPU, and wherein the at least one CPU and the at least one GPU are coupled together via a system bus.

15. A method for enabling interactive visualization, comprising:
   maintaining a plurality of three-dimensional volumetric models represented by explicit surfaces;
   for a current point of view, generating and displaying images of the volumetric models in a manner that clarifies internal structures by calculating light attenuation continuously throughout the volumetric models and accounting for the light attenuation that is continuous inside the volumetric models as a function of spatial positions of the explicit surfaces; and
   upon receiving user input that adjusts a display variable, repeating the generating and the displaying of the images in accordance with the display variable that has been adjusted, thereby enabling interactive visualization of the volumetric models while simultaneously clarifying the internal structures by accounting for the light attenuation inside the volumetric models,
   wherein generating each image comprises:
      for each section of the at least one image plane, identifying which fragment has a minimal distance from the at least one image plane, and calculating the minimal distance;
      for each section of the at least one image plane, identifying which fragment has a maximal distance from the at least one image plane, and calculating the maximal distance;
      for each fragment, computing the rendering color;
      for each fragment, computing an accumulation weight according to a spatial position of the fragment based on the minimal distance and the maximal distance;
      for each section of the at least one image plane, multiplying the accumulation weight with the rendering color for each fragment to produce a multiplied rendering color, summing each multiplied rendering color to produce a summed multiplied rendering color, and summing each accumulation weight to produce a summed accumulation weight;
      for each section of the at least one image plane, dividing the summed multiplied rendering color by the summed accumulation weight to produce a normalized rendering color;
      for each section of the at least one image plane, calculating a background blending weight according to the spatial position and an extent of the volumetric models based on the minimal distance and the maximal distance;
      for each section of the at least one image plane, blending the normalized rendering color with the background using the background blending weight to produce a blended color; and
      generating the image based on the blended color of each section of the at least one image plane.

16. The method of claim 15, wherein the explicit surfaces representing the three-dimensional volumetric models comprise polygonal meshes and/or parametric surfaces.

17. The method of claim 16, wherein:
   the images are generated in accordance with at least one image plane having a plurality of sections;
   generating each image comprises, for each section of the at least one image plane, identifying fragments of the explicit surfaces through which an imaginary line stemming from the current point of view traverses following a direction of view, determining a rendering color for each fragment, and determining an aggregate color as a function of each rendering color and a spatial position of each fragment, and generating the image based on the aggregate color of each section of the at least one image plane; and
   the aggregate color is determined by accumulating the rendering color for each fragment to produce an accumulated rendering color, normalizing the accumulated rendering color to produce a normalized color, and blending the normalized color with a background.

18. The method of claim 15, wherein an envelope surface encapsulates the volumetric models, and identifying which fragment has the maximal distance from the at least one image plane comprises identifying an envelope fragment of the envelope surface having the maximal distance from the at least one image plane.

19. A non-transitory computer readable medium having recorded thereon statements and instructions that, when executed by a processor of a computing device, implement a method according to claim 15.

20. A computing device, comprising:
   a user interface; and
   interactive volumetric visualization circuitry coupled to the user interface and configured to implement a method according to claim 15.

* * * * *